US011928482B2

(12) United States Patent
Karnati et al.

(10) Patent No.: US 11,928,482 B2
(45) Date of Patent: Mar. 12, 2024

(54) INTERACTION WITH ELECTRONIC CHAT INTERFACES (71) Applicant: Google LLC, Mountain View, CA (US)

(72) Inventors: Sriram Bhargav Karnati, Sunnyvale, CA (US); Varun Soundararajan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 346 days.

(21) Appl. No.: 15/621,375

(22) Filed: Jun. 13, 2017

(65) Prior Publication Data
US 2018/0357072 A1 Dec. 13, 2018

(51) Int. Cl.
G06F 9/451 (2018.01)
G06F 3/01 (2006.01)
(Continued)

(52) U.S. Cl.
CPC .............. G06F 9/451 (2018.02); G06F 3/01 (2013.01); G06F 3/167 (2013.01);
(Continued)

(58) Field of Classification Search
CPC ......... G06F 17/30864; G06F 17/30867; G06F 17/30; G06F 17/30554; G06F 17/30964;
(Continued)

(56) References Cited

U.S. PATENT DOCUMENTS 9,098,584 B1 * 8/2015 Fredinburg ........... G06F 16/532
9,317,873 B2 4/2016 Agrawal et al.
(Continued)

FOREIGN PATENT DOCUMENTS

CN 101009576 8/2007
CN 101384999 3/2009
(Continued)

OTHER PUBLICATIONS

International Search Report and Written Opinion issued in International Application No. PCT/US2017/037258, dated Sep. 8, 2017, 16 pages.
(Continued)

Primary Examiner — Tonia L Dollinger
Assistant Examiner — Linh T. Nguyen
(74) Attorney, Agent, or Firm — Fish & Richardson P.C.

(57) ABSTRACT

A method includes, for each of a plurality of web resources, receiving, at a communications server, data indicating characteristics of a respective web resource, detecting, based on the received data, that the respective web resource provides functionality for live assistance by a third party content provider through a chat user interface on the respective web resource, and storing, in a database, an entry that indicates that the respective web resource has the functionality. The method includes receiving, from a user, a request to access a particular web resource hosted by a particular third party content provider, determining, based on a stored entry in the database representing the particular web resource, that the web resource provides functionality for live assistance by the particular third party content provider through a particular chat user interface on the web resource, and initiating a chat session between the user and the third party content provider.

20 Claims, 4 Drawing Sheets (51) Int. Cl.

| | |
|---|---|
| *G06F 3/16* | (2006.01) |
| *G06Q 10/1093* | (2023.01) |
| *H04L 12/18* | (2006.01) |
| *H04L 51/02* | (2022.01) |
| *H04L 51/046* | (2022.01) |
| *H04L 51/10* | (2022.01) |
| *H04L 51/216* | (2022.01) |
| *H04L 65/1069* | (2022.01) |

(52) U.S. Cl.
CPC ..... *G06Q 10/1093* (2013.01); *H04L 12/1813* (2013.01); *H04L 12/1818* (2013.01); *H04L 51/02* (2013.01); *H04L 51/046* (2013.01); *H04L 51/10* (2013.01); *H04L 51/216* (2022.05); *H04L 65/1069* (2013.01)

(58) Field of Classification Search
CPC ........... G06F 17/3028; G06F 17/30395; G06F 17/30752; G06F 17/30312; G06F 17/3084; G06F 17/30997; G06F 2221/0737; G06F 17/30979; G06F 17/3064; G06F 17/30702; G06F 17/3082; G06F 17/30893; G06F 17/3097; G06F 17/30477; G06F 17/30522; G06F 17/30528; G06F 17/30545; G06F 17/30598; G06F 17/30722; G06F 3/0236; G06F 3/0482; G06F 3/0484; G06F 9/453; G06F 16/3322; G06F 3/04817; G06F 16/332; G06F 16/24; G06F 16/73; G06F 16/44; G06F 16/64; G06F 16/972; G06F 16/5846; G06F 16/5866; G06F 16/583; G06F 16/242; G06F 16/24575; G06F 16/438; G06F 16/95; G06F 16/9535; G06F 3/04842; G06F 3/167; G06F 3/01; G06F 9/451; G06F 16/248; G06F 16/0536; G06F 40/00; G06F 16/953; G06F 16/24522; G06F 16/90332; G06F 16/90335; G06F 16/9538; G06F 16/243; G06F 16/245; G06F 16/9038; G06F 16/3344; G06F 16/3329; G06Q 30/0256; G06Q 30/0601; G06Q 50/01; G06Q 30/02; G06Q 30/0251; G06Q 30/0271; G06Q 30/0613; G06Q 30/0623; G06Q 30/0641; G06Q 30/0631; G06Q 30/08; G06Q 10/1093; G10L 15/08; H04L 67/02; H04L 67/20; H04L 51/16; H04L 51/02; H04L 51/046; H04L 12/1813; H04L 51/10; H04L 65/1069; H04L 67/36; H04L 12/1818; H04L 51/063; H04L 56/1069; G06K 9/72; G06K 9/2081
USPC ........... 705/4.55, 14.51, 14.23, 14.49, 14.54, 705/14.62; 707/706, 722, 728, 769, 707/17.108, 707, 999.003 E, 17.017, 713, 707/723, 736, 999.004, 999.005; 715/753, 738; 709/213, 217, 203
See application file for complete search history.

(56) References Cited

U.S. PATENT DOCUMENTS

| | | | |
|---|---|---|---|
| 9,762,734 B1* | 9/2017 | McCarthy-Howe | H04M 3/5183 |
| 10,061,851 B1* | 8/2018 | Su | G06F 16/951 |
| 10,581,765 B2 | 3/2020 | Koukoumidis et al. | |
| 2002/0087522 A1* | 7/2002 | MacGregor | G06Q 30/02 |
| 2003/0185232 A1 | 10/2003 | Moore et al. | |
| 2005/0182675 A1* | 8/2005 | Huettner | G06Q 30/0258 705/14.56 |
| 2005/0188095 A1* | 8/2005 | Gardiner | G06F 9/5033 709/230 |
| 2006/0248149 A1 | 11/2006 | Kraft et al. | |
| 2007/0055652 A1 | 3/2007 | Hood et al. | |
| 2007/0083408 A1* | 4/2007 | Altberg | G06Q 30/02 705/14.69 |
| 2007/0185768 A1* | 8/2007 | Vengroff | G06Q 30/04 705/14.64 |
| 2007/0269037 A1 | 11/2007 | Gardniner et al. | |
| 2008/0052377 A1 | 2/2008 | Light | |
| 2008/0288349 A1 | 11/2008 | Weisberg | |
| 2009/0077176 A1 | 3/2009 | Shae et al. | |
| 2009/0241031 A1* | 9/2009 | Gamaley | G06F 3/0481 715/736 |
| 2009/0245500 A1 | 10/2009 | Wampler | |
| 2009/0281966 A1* | 11/2009 | Biggs | G06F 16/951 706/11 |
| 2010/0002685 A1* | 1/2010 | Shaham | H04M 3/002 370/352 |
| 2011/0055207 A1 | 3/2011 | Schorzman et al. | |
| 2011/0125735 A1* | 5/2011 | Petrou | G06F 17/30 707/723 |
| 2011/0131180 A1* | 6/2011 | Tuli | G06Q 10/10 707/610 |
| 2011/0131241 A1* | 6/2011 | Petrou | G06F 16/95 707/770 |
| 2011/0141919 A1* | 6/2011 | Singh | H04L 41/0681 370/252 |
| 2011/0295689 A1* | 12/2011 | Brady | G06Q 30/0241 705/14.54 |
| 2012/0117049 A1* | 5/2012 | Zhou | G06F 16/951 707/706 |
| 2012/0265615 A1* | 10/2012 | Munisamy | G06Q 30/0277 705/14.58 |
| 2013/0129072 A1 | 5/2013 | Minert | |
| 2013/0151409 A1 | 6/2013 | Stine | |
| 2013/0167044 A1 | 6/2013 | Graves et al. | |
| 2013/0275164 A1* | 10/2013 | Gruber | G10L 17/22 705/5 |
| 2013/0275862 A1 | 10/2013 | Adra | |
| 2013/0311339 A1 | 11/2013 | Jeremias | |
| 2014/0095427 A1* | 4/2014 | Fox | G06F 17/30864 707/603 |
| 2014/0098949 A1* | 4/2014 | Williams | H04M 3/5191 379/265.09 |
| 2014/0330769 A1* | 11/2014 | Nguyen | G06F 16/24575 707/723 |
| 2015/0040026 A1* | 2/2015 | Sergunin | H04L 67/02 715/745 |
| 2015/0066479 A1 | 3/2015 | Pasupalak | |
| 2015/0120357 A1* | 4/2015 | Tuchman | G06Q 10/063114 705/7.15 |
| 2015/0142982 A1* | 5/2015 | Gonzales | H04L 65/1069 709/227 |
| 2015/0235289 A1* | 8/2015 | Jeremias | G06Q 30/0613 705/26.41 |
| 2015/0287099 A1 | 10/2015 | Soundararajan et al. | |
| 2015/0319203 A1* | 11/2015 | Jeremias | H04L 29/06 715/753 |
| 2015/0327324 A1* | 11/2015 | Wei | H04W 52/0235 370/280 |
| 2016/0132812 A1 | 5/2016 | Beasley | |
| 2016/0149842 A1 | 5/2016 | Chang et al. | |
| 2017/0091780 A1 | 3/2017 | Kannan | |
| 2018/0025085 A1* | 1/2018 | Sarangi | H04L 67/02 707/722 |
| 2018/0173714 A1* | 6/2018 | Moussa | G06F 16/248 |
| 2018/0198903 A1* | 7/2018 | Kim | G10L 15/26 |
| 2018/0218080 A1 | 8/2018 | Krishnamurthy | |
| 2018/0225365 A1* | 8/2018 | Altaf | G06F 16/3344 |
| 2018/0232759 A1* | 8/2018 | Bordash | G06Q 30/0256 |
| 2018/0287968 A1 | 10/2018 | Koukoumidis et al. | |
| 2018/0332167 A1 | 11/2018 | Lu et al. | |

(56) References Cited

U.S. PATENT DOCUMENTS

2018/0336569 A1* 11/2018 Ritchie ................ H04L 51/046
2019/0251125 A1 8/2019 Song et al.

FOREIGN PATENT DOCUMENTS

| | | |
|---|---|---|
| CN | 101394371 | 3/2009 |
| CN | 104317796 | 1/2015 |
| CN | 104335557 | 2/2015 |
| CN | 104866560 | 8/2015 |
| CN | 105099858 | 11/2015 |
| JP | 2007034465 | 2/2007 |
| JP | 2008-276460 | 11/2008 |
| JP | 2010277207 | 12/2010 |
| JP | 2013530447 | 7/2013 |
| JP | 2003092628 | 5/2016 |
| JP | 2016-197891 | 11/2016 |
| JP | 2016100018 | 1/2017 |
| KR | 10-2016-0069456 | 6/2016 |
| KR | 10-2016-0113568 | 9/2016 |
| KR | 10-2017-0029466 | 3/2017 |
| WO | 2015148458 | 10/2015 |

OTHER PUBLICATIONS

International Preliminary Report on patentability issued in International Application No. PCT/US2017/037258, dated Sep. 20, 2019, 7 pages.

European Office Action in European Application No. 17731790.6, dated Aug. 7, 2019, 3 pages.
EP Office Action in European Application No. 17731790, dated Apr. 6, 2020, 7 pages.
JP Office Action in Japanese Application No. 2019-540576, dated Nov. 2, 2020, 5 pages (with English translation).
JP Office Action in Japanese Application No. 2019-540576, dated Feb. 15, 2021, 6 pages (with English translation).
IN Office Action in Korean Application No. 201927026841, dated Jun. 2, 2021, 5 pages.
KR Office Action in Korean Application No. 2019-7022765, dated May 24, 2021, 10 pages (with English translation).
Notice of Allowance in Japanese Appln. No. 2021-038250, dated Jul. 11, 2022, 5 pages (with English translation).
Notice of Allowance in Korean Appln No. 10-2021-7025717, dated Mar. 23, 2022, 22 pages (with English translation).
Office Action in Chinese Appln. No. 201780084780.4, dated Dec. 1, 2022, 34 pages (with English translation).
Office Action in Japanese Appln No. 2021-038250, dated Mar. 14, 2022, 6 pages (with English translation).
Office Action in Korean Appln. No. 10-2019-7022765, dated Jul. 6, 2021, 3 pages (with English translation).
Office Action in Korean Appln. No. 10-2021-7025717, dated Nov. 23, 2021, 10 pages (with English translation).
Office Action in Japanese Appln No. 2022-128163, dated Aug. 28, 2023, 8 pages (with English translation).

* cited by examiner

INTERACTION WITH ELECTRONIC CHAT INTERFACES

BACKGROUND

This document relates to chat interfaces through which users can communicate with content providers who provide access to resources or content. Chat interfaces can be inconsistent across content providers and can be implemented and presented in different ways. Furthermore, there can also exist some or full loss in functionality when existing chat interfaces are presented on mobile devices. Additionally, there is little recourse when a chat session is disconnected.

SUMMARY

In general, one innovative aspect of the subject matter described in this specification can be embodied in a method that includes receiving, by the communications server and from a user, a search request for content and obtaining, by the communications server in response to the search request, search results in the form of a plurality of selectable content items on a display web page, each selectable content item including a link to a respective web resource associated with the search request. The method includes determining, by the communications server based on information obtained from a database relating to characteristics of a plurality of web resource, that a particular web resource provides functionality for live assistance by a particular third party content provider through a particular chat user interface on the particular web resource, and, for said the particular web resource, automatically providing a chat interface on the display web page, the chat interface said chat interface being rendered and/or controlled by the communication server for display adjacent to the respective selectable content item on the display web page. Responsive to user interaction with the chat interface from the display webpage, the communications server initiates a chat session between the user and the particular third party content provider associated with the particular web resource.

These and other embodiments can each optionally include one or more of the following features. In some implementations, the method includes populating a database with database entries relating to a plurality of web resources. Populating the database includes, for each of said plurality of webpages, receiving, at the communications server, data indicating characteristics of a respective web resource, detecting, by the communications server and based on the received data, that the respective web resource provides functionality for live assistance by a third party content provider through a chat user interface on the respective web resource, and storing, by the communications server and in a database, an entry that indicates that the respective web resource has the functionality. The steps for populating the database are performed periodically to capture data for webpages that are not already included in the database.

In some implementations, the chat session includes a first session between the communications server and the user, and a second session between the communications server and the third party content provider. In some implementations, the method can include detecting, by the communications system, no activity in the chat session for a predetermined period of time, detecting, by the communications system, that at least one of the first session or the second session has ended, determining, by the communications system and based on context data of the chat session, that the user has not completed the chat session, storing, in the database, data indicating the entirety of the first session, initiating, by the communications system and in response to detecting that the second session has ended, a third session between the communications server and the third party content provider as part of the chat session, and providing, by the communications system and to the third party content provider, the data indicating at least a portion of the first session such that the user is able to resume the chat session with the third party content provider.

In some implementations, the method includes receiving, at the communications server and from the user, input to the first session through the chat user interface, and providing, by the communication server and to the third party content provider, data indicating the user input to the second session. In some implementations, the request to access the particular web resource includes a voice input. In some implementations, the method includes receiving, by the communications system and from the user, a second voice input in the first session, providing, to the third party content provider, data indicating a text representation of the second voice input in the second session, receiving, by the communications system and from the third party content provider, text input from the third party content provider in the second session between the communications system and the third party content provider, and providing, by the communications system and to the user, data indicating a voice representation of the text input from the third party content provider in the first session.

In some implementations, the chat user interface is a chat widget. In some implementations, determining that a particular web resource provides functionality for live assistance by a particular third party content provider through a particular chat user interface on the particular web resource includes accessing, by the communications system, the web resource, identifying, by the communications system, a widget on the web resource, and identifying, by the communications system and in code for the widget on the web resource, a tag indicating that the web resource provides functionality for live assistance by third party content provider through a chat user interface on the web resource.

In some implementations, the live assistance is provided by a human representative of the particular third party content provider.

In some implementations, the method includes, for each of a plurality of chat sessions initiated for the particular web resource, determining, by the communications system and based on a unique identifier of the content item that directed the user to the particular web resource, a content item metric value for the chat session. The method includes generating, by the communications system and using the content item metric values, a presentation of the content item metric values, and providing, by the communications system to the third party content provider, the presentation for display.

In some implementations, determining that a particular web resource provides functionality for live assistance by a particular third party content provider through a particular chat user interface on the particular web resource includes accessing, by the communications system, the web resource, determining, by the communications system, that a new window that is separate from a window in which the web resource is being accessed has opened, and determining, in the new window, a text phrase indicating that the web resource provides functionality for live assistance by third party content provider through a chat user interface on the web resource.

In some implementations, the user accesses the chat session through a network-connected device. The network-connected device can be a mobile device. The network-connected device can be a desktop device. In some implementations, the network-connected device does not have a screen.

In some implementations, initiating a chat session between the user and the particular third party content provider includes receiving, by the communications server and from the third party content provider, a first unique session identifier for the first session of the chat session, and providing, by the communications server and to the third party content provider, the first unique session identifier to facilitate the second session.

Another innovative aspect of the subject matter described in this specification can be embodied in a system that includes a device communicably connected to a network, a third party content provider server communicably connected to the network, and a communications server that performs operations for implementing the method as described above.

Yet another innovative aspect of the subject matter described in this specification can be embodied in at least one computer-readable storage medium encoded with executable instructions that, when executed by at least one processor, cause the at least one processor to perform operations for implementing the method as described above.

Another innovative aspect of the subject matter described in this specification can be embodied in a method that includes, for each of a plurality of web resources, receiving, at a communications server, data indicating characteristics of a respective web resource, detecting, by the communications server and based on the received data, that the respective web resource provides functionality for live assistance by a third party content provider through a chat user interface on the respective web resource, and storing, by the communications server and in a database, an entry that indicates that the respective web resource has the functionality. The method includes receiving, by the communications server and from a user, a request to access a particular web resource hosted by a particular third party content provider, determining, by the communications server and based on a stored entry in the database representing the particular web resource, that the particular web resource provides functionality for live assistance by the particular third party content provider through a particular chat user interface on the particular web resource, and initiating, by the communications server, a chat session between the user and the third party content provider.

In some implementations, the chat session includes a first session between the communications server and the user, and a second session between the communications server and the third party content provider. The method can include receiving, at the communications server and from the user, input to the first session through the chat user interface, providing, by the communication server and to the third party content provider, data indicating the user input to the second session, and maintaining state information of the chat session between the user and the third party content provider. The method can include detecting, by the communications system, no activity for a predetermined period of time, detecting, by the communications system, that at least one of the first session or the second session has ended, determining, by the communications system and based on context data of the chat session, that the user has not completed the chat session, storing, in the database, data indicating the entirety of the first session, initiating, by the communications system and in response to detecting that the second session has ended, a third session between the communications server and the third party content provider as part of the chat session, and providing, by the communications system and to the third party content provider, the data indicating at least a portion of the first session such that the user is able to resume the chat session with the third party content provider.

In some implementations, the request to access the particular web resource comprises a voice input. The method can include receiving, by the communications system and from the user, a second voice input in the first session, providing, to the third party content provider, data indicating a text representation of the second voice input in the second session, receiving, by the communications system and from the third party content provider, text input from the third party content provider in the second session between the communications system and the third party content provider, providing, by the communications system and to the user, data indicating a voice representation of the text input from the third party content provider in the first session.

In some implementations, initiating, by the communications server, a chat session between the user and the third party content provider includes receiving, by the communications server and from the third party content provider, a first unique session identifier for the first session of the chat session, and providing, by the communications server and to the third party content provider, the first unique session identifier to facilitate the second session.

In some implementations, the request is provided in response to a selection of a content item that is presented in response to a search request, and links to the particular web resource. The chat interface can be presented on a web page that displays results that are responsive to the search request, and the content item.

In some implementations, the chat user interface is a chat widget. In some implementations, detecting that the respective web resource provides functionality for live assistance by a third party content provider through a chat user interface on the respective web resource includes accessing, by the communications system, the web resource, identifying, by the communications system, a widget on the web resource, and identifying, by the communications system and in code for the widget on the web resource, a tag indicating that the web resource provides functionality for live assistance by third party content provider through a chat user interface on the web resource.

In some implementations, the live assistance is provided by a human representative of the particular third party content provider. In some implementations, the method includes, for each of a plurality of chat sessions initiated for the particular web resource, determining, by the communications system and based on a unique identifier of the content item that directed the user to the particular web resource, a content item metric value for the chat session, generating, by the communications system and using the content item metric values, a presentation of the content item metric values, and providing, by the communications system to the third party content provider, the presentation for display.

In some implementations, detecting that the respective web resource provides functionality for live assistance by a third party content provider through a chat user interface on the respective web resource includes accessing, by the communications system, the web resource, determining, by the communications system, that a new window that is separate from a window in which the web resource is being accessed has opened, and determining, in the new window, a text phrase indicating that the web resource provides functionality for live assistance by third party content provider through a chat user interface on the web resource.

In some implementations, the user accesses the chat session through a network-connected device. The network-connected device can be a mobile device. The network-connected device can be a desktop device. In some implementations, the network-connected device does not have a screen.

Yet another innovative aspect of the subject matter described in this specification can be embodied in a system that includes a device communicably connected to a network, a third party content provider server communicably connected to the network, and a communications server that performs operations. The operations include, for each of a plurality of web resources, receiving data indicating characteristics of a respective web resource, detecting, based on the received data, that the respective web resource provides functionality for live assistance by third party content provider through a chat user interface on the respective web resource, and storing, in a database, an entry that indicates that the respective web resource has the functionality. The operations include receiving, from a user, a request to access a particular web resource hosted by a particular third party content provider, determining, based on a stored entry in the database representing the particular web resource, that the particular web resource provides functionality for live assistance by the particular third party content provider through a particular chat user interface on the particular web resource, and initiating, by the communications server, a chat session between the user and the third party content provider.

Another innovative aspect of the subject matter described in this specification can be embodied in at least one computer-readable storage medium encoded with executable instructions that, when executed by at least one processor, cause the at least one processor to perform operations. The operations include, for each of a plurality of web resources, receiving data indicating characteristics of a respective web resource, detecting, based on the received data, that the respective web resource provides functionality for live assistance by third party content provider through a chat user interface on the respective web resource, and storing, in a database, an entry that indicates that the respective web resource has the functionality. The operations include receiving, from a user, a request to access a particular web resource hosted by a particular third party content provider, determining, based on a stored entry in the database representing the particular web resource, that the particular web resource provides functionality for live assistance by the particular third party content provider through a particular chat user interface on the particular web resource, and initiating, by the communications server, a chat session between the user and the third party content provider.

The subject matter described in this specification can be implemented in particular embodiments so as to realize one or more of the following advantages. The proposed system for initiating and maintaining messaging sessions provides an efficient and optimized technique for identifying and interacting with a resource that provides the functionality of a chat interface. The proposed techniques, in one aspect, implements a chat interface including chat sessions that are rendered and managed by a control or communications server/gateway to enable a seamless, reliable and scalable chat interface, irrespective of the browser capabilities, service provider or operating systems in use by a user, on a user interface terminal or the chat interface functionality provided by a resource or content provider. The system reduces the number of computing resources used to initiate and maintain a chat session between a user and a content provider. The system makes the chat interface more robust by maintaining separate sessions between a user and a gateway, and a content provider and the gateway and storing session data in order to re-establish disconnected chat sessions. Additionally, the gateway can keep the sessions open in case of temporary loss of connection, thus improving the reliability of the chat connection. If a chat session cannot be kept open and must be re-established, the user can continue a re-established chat session without interruption and without having to input redundant data that has already been provided through the previously established chat session. Additionally, by providing the chat interface without redirecting the user to the content provider's page, the system reduces network traffic associated with the user searching for the chat functionality. The system improves the functioning of a computer related technology, chat interfaces, as users are able to connect and communicate with content providers without experiencing frustration when searching for messaging functionality within each content provider's page or when disconnected from the content provider.

Furthermore, the gateway system improves the functioning of a computer related technology by providing the ability to scale chat functionality to multiple content providers without requiring strict integration. The system allows content providers to maintain some individuality and control over respective chat interfaces. The system's ability to conduct chat conversations without the use of a screen allows for hands-free communication, reducing burden on the user. Additionally, the system is able to post-process a chat to perform further actions with integrated applications. For example, if a response within a chat conversation is "we have scheduled an appointment at 5 p.m.," the system can automatically detect that there is a calendar event and add a calendar entry, ask the user about existing conflicts, and perform various other related tasks. Actions stemming from a chat conversation can be logged and/or provided for analysis, the results of which can be used to influence future chat interface presentations. The gateway system reduces user wait-time, as users with slow network connections are no longer required to visit a content provider's web page and request that the page be rendered. Instead, only the communications are transmitted, reducing network traffic and latency.

BRIEF DESCRIPTION OF THE DRAWINGS

Like reference numbers and designations in the various drawings indicate like elements.

DETAILED DESCRIPTION

This document describes methods, systems, and devices that improve connection strength and quality of communication sessions by providing a gateway between a user and a content provider with whom the user is communicating. The gateway relays content (e.g. messages) received at one communications interface of the user to the other communications interface of the content provider and maintains session information by preserving relevant data regarding the conversation between the user and the content provider, rather than providing one session directly between the user and the content provider without maintaining session data, such that a disconnection on either the user's or the content provider's side ends the session without the ability to re-establish the chat session.

In some situations, a conversation between client devices can be interrupted or disconnected, causing frustration for a user trying to get help and a content provider attempting to provide the help. For example, a customer calling an Internet provider for assistance with troubleshooting an Internet connection problem can get disconnected from the representative with whom he was speaking. The customer can attempt to call back but may be connected with a different representative to whom the customer must explain the situation again, resulting in an overall inefficient and cumbersome experience for the customer. Here, the gateway can detect and store particular data regarding a conversation between a user and a content provider in order to reduce the amount of time that the user and the content provider spend attempting to recover information provided and progress achieved prior to the disconnection. This also improves the electronic chat application/functionality, which is a computer-related technology, by preventing the loss of data that was previously communicated using the chat interface in the event that there is a breakdown in the chat interface (e.g., a loss of connection or other disruption of the communications link).

An electronic document is data that presents a set of content at a client device. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents contain digital components that are presented for consumption by a user.

As used throughout this document, the term "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider), but could be a combination of content from multiple sources. Digital components from multiple different sources can be combined into a single electronic document (e.g., collection of various different digital components), and portions of various digital components from different sources can be combined into a single digital component with information extracted from search results (or other portions of content).

A search engine can direct users to results that link to various web pages of content providers. The users can contact content providers, for example, by calling a phone number provided on the corresponding web page for a particular content provider. In another example, the users can contact the content providers by emailing or mailing the content providers at a particular address listed on the corresponding web page for the particular content provider.

In some examples, the users can contact content providers through a user interface provided on the particular content provider's web page. The user interface can be, for example, a chat interface through which a user can communicate with a representative of the particular content provider. Many web pages have different formats that include different placements of interface elements that direct a user to a chat interface. For example, a web page can include a button that directs a user to a chat interface.

Chat interfaces generally include a textbox through which the user can provide input to be transmitted to the other party with whom the user is communicating. Additionally, other user interface elements for submitting and editing the user input can generally be included on chat interfaces; such user interface elements can be small elements that must be accessed by navigating a user interface menu. For example, commonly used interface elements include small buttons for sending a message or switching keyboards, or menus for selecting content to send, such as picture or video data.

Some web pages can require a user to navigate a web site tree to reach a chat interface. For example, a user interface element that directs a user to a chat interface through which the user can contact the content provider can be displayed on a page other than the main page of the content provider's website. The user interface element can be located in obscure locations or sized such that a user has trouble selecting the user interface element in order to access the chat interface.

Chat interfaces can be difficult to use on mobile devices because screen area on a mobile device is generally smaller than screen area on a desktop client device. For example, the screen area on a smartphone is generally smaller than the screen area on a desktop computer with a monitor. User interface elements that are small on desktop client devices can be many times smaller and more difficult to select on mobile devices.

In some examples, a web page can provide a link to a chat interface that opens a new window. When viewed on a mobile device with a small screen, it can be difficult to interact with the chat interface. A user may be unable to manipulate the chat interface in order to interact with the chat interface at all, causing frustration for a user and reducing the value of offering a chat interface for many content providers.

When a chat session is initiated between a user and a content provider representative, disconnection of the chat session generally means that the user must provide any information that she previously provided to the content provider in order to reach the same point in the conversation between the user and the content provider representative when the disconnection occurred. For example, through a chat interface for a chat session, a user looking for support for a particular type of ham radio can provide his registration number, his desired broadcast frequency, and a description of the problem he is having to a representative of the manufacturer of the ham radio that he is using. If the user's chat session with the representative of the manufacturer is disconnected, the user generally must navigate to the manufacturer's web page, find a user interface element that directs him to the manufacturer's chat interface, and again provide all of the information that he had previously presented (i.e., his registration number, his desired broadcast frequency, and a description of the problem he is having) to another representative of the manufacturer once a new chat session has been established.

This document describes methods, systems, and devices that reduce the amount of computer resources used to conduct and restore a chat session between a user and a content provider. In some situations, the web site of a content provider includes a user interface element that directs a user to a chat interface and begins a chat session between the user and a representative of the content provider. For example, a tractor company's web site can include a button for connecting a user to a live representative of the tractor company. The button can be displayed in various ways, including as a navigation menu item, prominently as a key feature on a Support or Contact Us page of the tractor company's web site, or as an action suggestion that appears based on a user's behavior while visiting the tractor company's web site.

A system identifies that a content provider, such as the tractor company, offers the option to chat with a representative and stores data indicating that the content provider's web site provides the option to use a chat interface. Once the web site has been identified as providing the functionality of a chat session, such as a live chat session or an automated chat session with a library of answers built using messaging machine learning models, the system can indicate that the web page provides chat functionality. For example, the system can indicate in search results in which the web site appears that the web site provides the functionality of a chat session.

The messaging machine learning models may be models that accept response data from the user and from the content provider as inputs. The messaging machine learning models may use any of a variety of models, such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the messaging machine learning models may use supervised learning. In other examples, the messaging machine learning models use unsupervised learning.

The web page can provide a user interface element through which users can initiate a chat session with the content provider. Once a user selects the user interface element to initiate a chat session with the content provider, the system identifies characteristics of the chat session to use when initiating and facilitating the chat session. For example, the system can store a device identifier for a client device through which the user provides input to the chat interface, a session identifier for the particular session between the client device and a particular representative of the content provider, and a device identifier for a device through which the particular representative of the content provider inputs data to the chat interface.

The system can act as a gateway for chat sessions between a user and a content provider. The system conducts a first chat session with the user and a second separate chat session with the content provider, and relays messages between the user and the content provider using data indicating the input provided in the first chat session and the second chat session.

Text chat interfaces will be discussed throughout this document, but the techniques discussed herein can be applied to a voice chat session that is initiated using a computing device, such as a personal digital assistant. For example, the personal digital assistant may receive audio input (e.g., a spoken query or command) from a user through a microphone of the personal digital assistant, and provide the user with search results, and/or other information, using audio that is output by a speaker of the personal digital assistant. If the personal digital assistant is implemented in a computing device that includes a display, or is connected (e.g., wirelessly or by wire) to a display or another device that presents information on a display, the personal digital assistant can also present visual information, such as one or more of the search results and/or other information related to the audio input. Note that the personal digital assistant (PDA) can be implemented across multiple different physical devices (e.g., mobile phone, a tablet, an audio/video streaming device, a table top PDA unit, and/or other devices), and that the input can be received by one of the devices (e.g., a table top PDA unit), and the audio and/or visual output can be presented by a different one of the devices (e.g., the mobile phone). Similarly, some of the information being provided in response to the query or command may be output by one of the devices (e.g., audio information output by the table top PDA unit), while a different portion of the information (e.g., visual information) can be presented by a different one of the devices (e.g., a mobile phone or a display that includes the audio/video streaming device).

As part of the audio output and/or visual information, the PDA can present an option for the user to initiate a chat session. For example, the PDA may audibly ask the user if they would like to connect to, or chat with, an agent that can provide them more information, and the user can vocally respond affirming their desire to connect to the agent (e.g., by speaking the word "yes" or the words "connect me with the agent"). In response to the user affirming their desire to connect to an agent, the PDA can initiate a text chat session (e.g., using the mobile device) and/or initiate a phone call to the agent (e.g., using the mobile device and/or the table top PDA unit, which is configured to place voice telephone calls, for example, by way of Internet Protocol telephony). When the user is connected to the agent, the techniques discussed throughout this document can be used to maintain a state of the chat session (e.g., text or voice), thereby enabling the chat session to be seamlessly continued even if the chat session is interrupted. In the case of a voice chat session, voice recognition technologies can be used to translate the voice interactions into text, such that the techniques discussed herein can be also be used in those situations.

Figure 1:
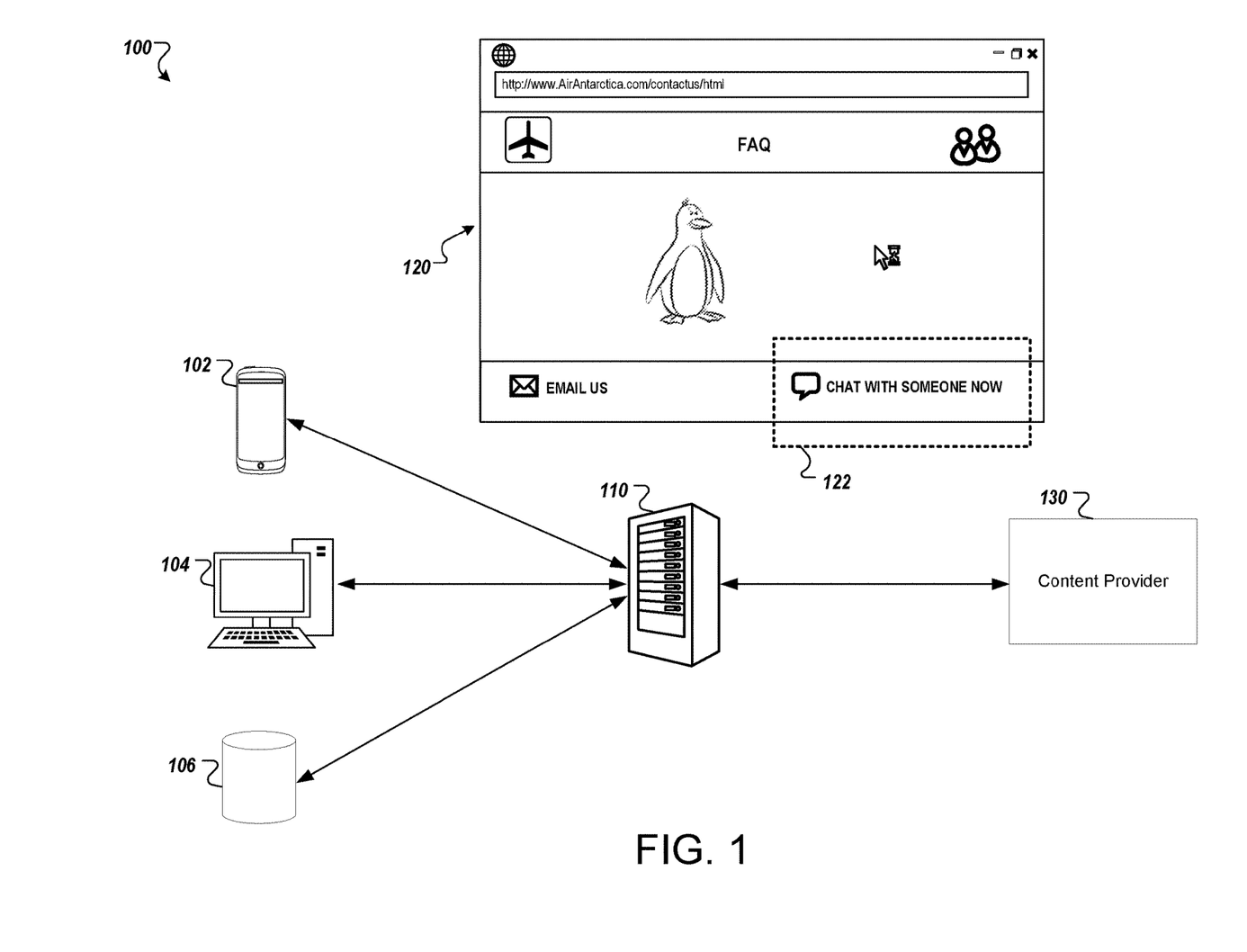
FIG. 1 is a block diagram of an example environment in which users can contact content providers through various devices.

FIG. 1 is a block diagram of an example environment 100 in which a user can communicate with a content provider. The example environment 100 includes a mobile device 102, a client device 104, a screen-less assistant device 106 (e.g., a table top PDA unit), a gateway 110, an example web page 120, and a content provider system 130. The devices 102, 104, and 106 are connected to the gateway 110 and to the content provider system 130 over a network, such as a local area network (LAN), a wide area network (WAN), the Internet, or a combination thereof.

The mobile device 102, the client device 104, and the screen-less assistant device 106 are electronic devices that are each capable of requesting and receiving resources over the network. Example mobile devices 102 include cellphones, smart phones, tablets, and other portable mobile devices through which a user can connect to a content provider over the network. Example client devices 104 include personal computers, mobile workstations, and laptop computers. The devices 102, 104, and 106 typically include user applications, such as a web browser, to facilitate the sending and receiving of data over the network, but native applications executed by the client device 106 can also facilitate the sending and receiving of data over the network.

Devices 102, 104, or 106 can submit search queries to a search system, such as a search engine, over the network. In response, the search system accesses a search index to identify electronic documents that are relevant to the search query. The search system identifies the electronic documents in the form of search results and returns the search results to the device 102, 104, or 106 in a search results page.

A search result is data generated by the search system that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the device 102, 104, or 106.

In some situations, the search system can be part of, or interact with, an application store (or an online portal) from which applications can be downloaded for install at a client device in order to present information about downloadable applications that are relevant to a submitted search query. Like other electronic documents, search results pages can include one or more digital component slots in which digital components (e.g., video clips, audio clips, images, or other digital components that can be formatted as advertisements) can be presented.

The gateway 110 facilitates the chat session and includes a back end and a front end. The back end of the gateway 110 provides infrastructure for the chat session, and communicates separately with the content provider and the user. For example, the back end can conduct a chat session with the content provider using the data input by the user through the client device, as well as a chat session with the user using the data input by the representative of the content provider. The back end interface can be in a common format or package that the user or the content provider agree on, such as a particular script application programming interface (API), a particular Android application package (.apk), or various other appropriate packages.

The front end of the gateway 110 can be an interface through which one of the user and the content provider can provide input to be transmitted and presented to the other. For example, the front end can be a chat interface presented separately to the user and the content provider. The front end can be customized to the user and to the content provider, and can either have a default profile setting or be adjusted by the user or the content provider. For example, the front end for the user can include a larger text box and bold font, while the front end for the content provider can include additional functions, such as remote access and control of the user's device.

The gateway 110 identifies each web page that provides messaging functionality and stores data indicating that the web page provides the functionality. The identification of web pages that provide messaging functionality is generally performed before the web page is presented as a search result rather than at runtime of the search request.

Web pages that provide messaging functionality generally include a user interface element through which a user can initiate a messaging session, such as a button to begin a chat session. For example, the web page 120 is shown to include a button 122 that a user can select to begin a chat session with the content provider. The web page 120 can also include various other indications that messaging functionality is offered or supported, such as key text phrases. For example, the web page 120 includes text that reads "chat with someone now."

The gateway 110 can also identify that the web page 120 provides messaging or chat functionality by detecting certain script features of the web page 120, such as code snippets that cause a new window to be opened when a user selects a particular user interface element. Another feature of the web page 120 that may be used to determine whether the web page 120 provides chat functionality is whether the web page 120 includes a widget that is displayed on the web page 120 that links to a different web site or provider. For example, the web page 120 is likely to provide chat functionality if it provides a widget that communicates with a known chat service provider. Widgets can include identifiers for a particular session in addition to other communications information, such as the identifier for a particular client device, a particular case, etc.

Features such as links to certain domains known to provide messaging services also indicate that the web page 120 is likely to provide messaging functionality. For example, if a web page links to a known automated chat service, the gateway 110 can mark the web page 120 as supporting messaging functionality.

When the gateway 110 receives an initial search request, the gateway 110 accesses the stored data to determine whether the search results presented offer messaging functionality. If a particular web page offers messaging functionality, the gateway 110 generates a user interface element to be presented with the search results that indicates the type of messaging functionality provided and that, when selected, initiates a messaging session without directing the user to the search result web page.

The content provider system 130 is associated with a particular content provider and can be a network destination that provides resources in response to a search query. For example, the content provider system 130 can host resources, such as files, that users can download when searching for a particular query. The content provider system 130 includes a user interface through which representatives of the content provider can interact with users. In some examples, the user interface is a chat interface, through which the representatives can communicate in real-time with users.

The gateway 110 reduces the number of computing resources used to initiate and maintain a chat session between a user and a content provider. Additionally, by reducing the need for a user to navigate to the content provider's web page, the gateway 110 reduces network traffic associated with the user searching for the chat functionality and with having to transmit data relating to the content provider's web page.

Figure 2:
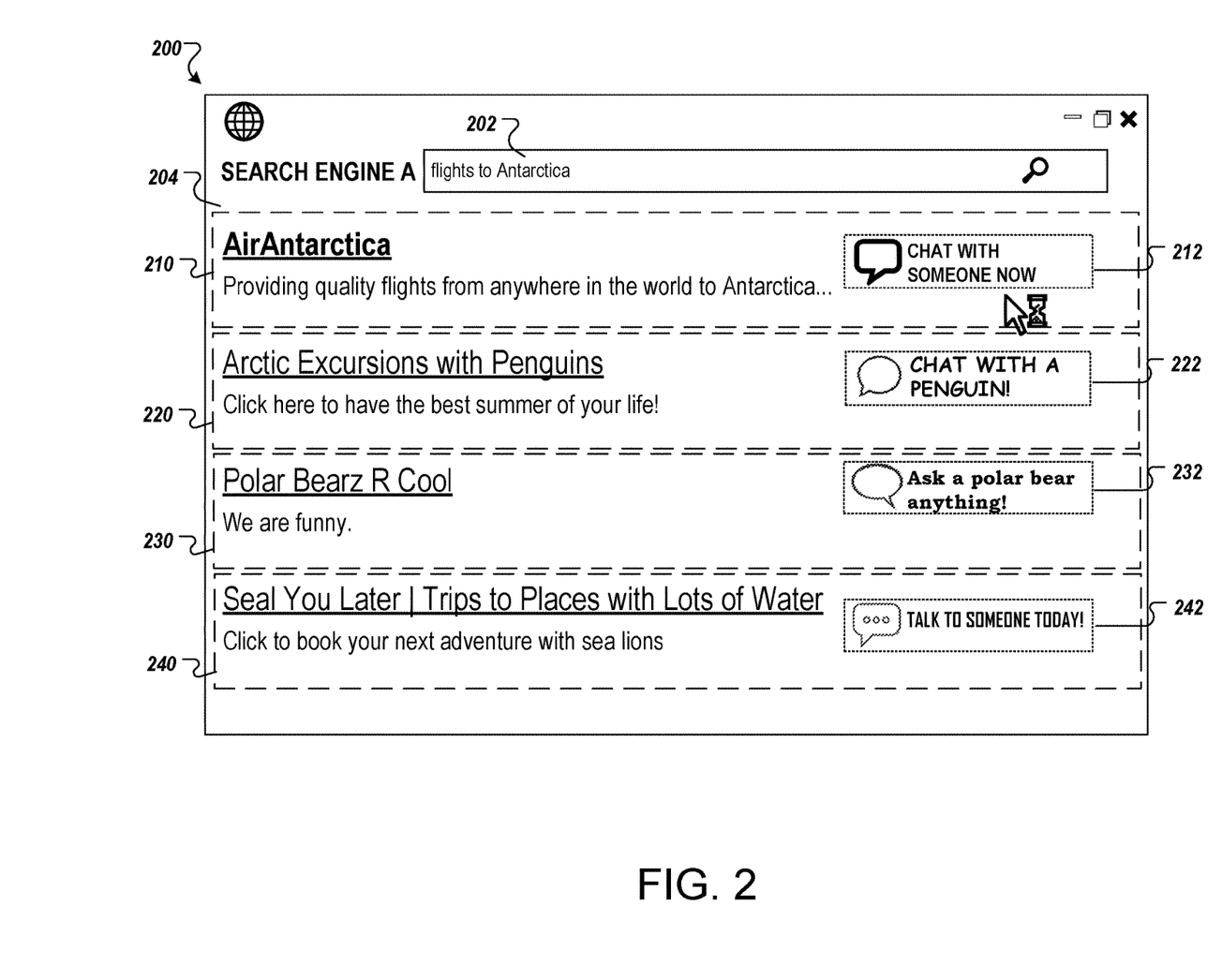
FIG. 2 is an example user interface shown for providing a chat interface to users.

FIG. 2 is an example user interface 200 for a chat session between a user and a content provider. The chat session can be performed by a system that includes at least two devices communicably connected by a network, such as the system 100. The chat session can be initiated, facilitated, and maintained by a communications gateway, such as the gateway 110.

The search query 202 is data input by a user to a search system, such as a search engine, that indicates a query for which the user is interested in seeing related results. The search engine can provide the results 210, 220, 230, and 240 on a search results page. Each of the results 210, 220, 230, and 240 are related to the search query 202, and in some implementations, can be ranked based on relevance to the search query 202.

The results 210, 220, 230, and 240 each include a respective user interface element 212, 222, 232, and 242 that directs the user to a chat interface with an associated content provider. The user interface elements 212, 222, 232, and 242 can be customized to the associated content provider's web page with which each element is presented. The customization can be based on various attributes of the particular associated web page, such as the font, the text size, or the color. For example, the user interface elements 212, 222, 232, and 242 each have a theme associated with the respective search result web page 210, 220, 230, and 240.

When a user selects one of the user interface elements 212, 222, 232, or 242, the gateway 110 initiates a chat session between the user and the content provider who provides the corresponding search result web page 210, 220, 230, or 240. In the example shown in FIG. 2, a user selects the user interface element 212 associated with the search result web page 210. The chat session is thus rendered, and therefore managed by the gateway. This enables the gateway, or a server associated with the gateway, implement controls and any required protocols and data structures to ensure scalability, security, reliability and storage associated with the chat session in a seamless manner, irrespective of the browser, operating system and any other user device or system specific that is currently in use by the user and/or the content provider.

Once the user selects the user interface element 212, the gateway 110 initiates a chat session with the content provider who provides the search result web page 210. The gateway 110 identifies the web page 120 and the user who selected the element 212 and stores data indicating the identifiers of the web page 120 and the user. The gateway 110 can also store various other attributes of the chat session, such as the length of the session, a first session identifier for the chat session with the user, a second, separate session identifier for the chat session with the content provider.

In order to maintain the session between the user and the content provider when the gateway 110 manages many different conversations between many different users and content providers, the gateway 110 directs responses from one session with the user to another session with the content provider. The gateway 110 uses the stored data indicating the session identifiers to properly forward messages between the user and the content provider.

The gateway 110 can receive input in various formats, format the input, and provide the input to a chat session between the user and the content provider. For example, the user can send a text message to a particular phone number to initiate a chat with a content provider. The particular phone number can be associated with the content provider, and receipt of the text message at the particular phone number can trigger the initiation of a chat session with the content provider. For example, receipt of the text message at the particular phone number can trigger the system to contact the gateway 110 and provide the user input as input to the chat session. When the user receives a response from the content provider, the gateway 110 can provide the response to the user as a text message. The user can also provide responses to the content provider through text message, or email, or various other appropriate communications methods.

The gateway 110 can process input from either the user or the content provider in various formats. For example, if a user interacts with the gateway 110 using the mobile device 102 and selects the user interface element 212 to initiate an email conversation with a content provider, a chat session can be initiated with the content provider and user input and responses can be presented within the email client interface.

In some implementations, if there is an existing conversation, the gateway 110 can provide a particular identifier, such as a phone number to which the user can provide input. For example, if the user is already connected to the content provider, the gateway 110 can detect user input in response to the content provider if the user input is provided to a different application, such as a text message application or an email client. The user's input can then be converted to input to be provided to the conversation.

When the session is established, a chat interface can be presented without directing the user to the web page 210, thereby reducing the number of network calls and/or data transferred to establish the chat session. For example, a chat interface can be presented on the search results page 204. As described above, chat interfaces can include user interface elements through which a user can input data. For example, chat interfaces can include text boxes in which the user can input responses or questions to be provided to the content provider and buttons with which the user can submit input. Additional interface elements can be provided within a chat interface, such as file attachments, screen sharing, etc.

The chat interface can be rendered within the search results page 204 using various rendering methods, such as headless rendering. The chat interface receives input from the user or the content provider and provides the input to the gateway 110 for transmission.

When the session is established, particular metrics can be calculated for the chat interface method of contacting the content provider, such as click-through rate, conversion rate, average traffic, time of access, etc. For example, a click-through rate associated with the chat functionality user interface element can be calculated. In some implementations, the content provider can access a report that is generated using the calculated metrics. For example, a content provider can review reports regarding the performance of the chat interface method and adjusting a campaign budget for the chat interface based on the reported metrics.

When the gateway 110 is used with the screen-less assistant device 106, the screen-less assistant device 106 can facilitate a conversation between the user and the content provider using the same infrastructure for chat sessions as the mobile device 102 and stationary client device 104. Because the screen-less assistant device 106 does not include a screen, however, the method of receiving and outputting data includes additional steps. The screen-less assistant device 106 can receive various types of appropriate input, such as voice input or touch input. For example, the screen-less assistant device 106 can receive a spoken command through a microphone of the screen-less assistant device 106. The spoken command can be processed and text data representing the voice input can be extracted. In some implementations, the screen-less assistant device 106 processes the voice input, while in other implementations, the gateway 110 or a remote system processes the voice input.

The gateway 110 can then use the text data as input to a session with the content provider. When the gateway 110 receives a response from the content provider, the response can be processed to be output in the same format as the input to the screen-less assistant device 110 was provided. For example, if the screen-less assistant device 110 received voice input, the screen-less assistant device 110 can receive data for output that includes voice data.

In an exemplary use of the system 100, a user can provide voice input to the mobile device 102 by saying "I want to talk to customer service for ABC Company." The mobile device 102 can then display search results that may include web pages identified as providing messaging functionality along with user interface elements that allow a user to initiate a messaging session.

A user can continue the conversation with the content provider on different devices. For example, if the user initiated the messaging session with the content provider on the mobile device 102, the user can continue the conversation with the content provider on the screen-less assistant device 106. The gateway 110 can detect the device on which the user is providing input or accessing the messaging session and select the appropriate output method, such as text, voice, picture, etc.

By maintaining the chat session using separate sessions with the user and with the content provider, the gateway 110 reduces the amount of computing resources required to re-enter and provide information previously provided by either the user or the content provider. For example, the user can continue the chat session without interruption, and without having to input redundant data that has previously been input through the already established chat session. Additionally the gateway 110 improves the robustness of the chat session by maintaining the sessions between the user and the content provider separately, such that a temporary disconnection in either session does not end the chat session.

In some examples, the gateway 110 saves the conversation between the user and the content provider by storing the data from the conversation as the conversation is conducted. If the user and the content provider become disconnected, the gateway 110 uses at least some of the stored data for the conversation up to the point that the user and the content provider were disconnected in order to re-establish a conversation between the user and the content provider.

When a chat session is re-established, the gateway 110 can conduct conversations with the content provider (or provide the content provider with the previous chat session) without further input from the user in order to catch the content provider up to the point of the previously conducted conversation with the user. For example, the gateway 110 can automatically provide stored data indicating a user's device information and problem description such that the next representative of the content provider with whom the user is connected is informed of the user's situation, and so the user can continue his conversation with the representative without repeating information previously provided. The gateway 110 can autonomously determine answers to a content provider's responses using a machine learning model that was trained using the user's previously provided answers. The machine learning models can receive as input the content provider's responses and output various appropriate responses.

In some examples, the gateway 110 is integrated with an existing messaging service provider and performs server-side integration by storing particular session data that allows a user to pick up the conversation at a particular point, such as when the user left the conversation. For example, the gateway 110 can provide the stored data to a different content provider representative once the gateway 110 has established a new messaging session.

In some implementations, the gateway 110 is unable to update the new representative up to the point of the previous conversation. For example, the new representative's responses to particular pieces of information can differ from the previous representative's response and the gateway 110 may be unable to steer the conversation in a direction in which the gateway 110 can provide all of the information that the user was previously able to provide to the representative. When the gateway 110 is unable to provide all of the information the user previously provided, the gateway 110 can provide the user with context for the conversation conducted without the user.

The gateway 110 can also perform client-side integration, by storing session data or user input. The gateway 110 can provide the stored data to a user when the conversation has been caught up or updated as much as the gateway 110 can, such that the user has context for the content provider representative's understanding of the situation.

The gateway 110 can detect when the user is inactive or unavailable. For example if the user leaves for a meeting or is away from his device without informing the content provider representative, the gateway 110 can mark the case inactive. The gateway 110 can determine, based on various characteristics of the current conversation, whether the user is inactive. Such characteristics include a threshold period of time passing between the content provider's latest response and the user's last response, certain phrases input by the user, certain phrases input by the content provider, or various event data associated with the user to which the gateway 110 has access. For example, if the user has a meeting scheduled during the conversation, the gateway 110 can determine that when the user does not respond within a threshold amount of time, that the user is at a meeting.

When a conversation is marked inactive, the gateway 110 can notify the content provider that the user is away. For example, if the user is detected to be inactive, the gateway 110 can provide a response to the content provider representative on behalf of the user asking the content provider representative to hold on and stay connected for a few minutes.

In some examples, the gateway 110 can mark a case as resolved instead of inactive. For example, if a user does not respond for a threshold amount of time, but there has been an indication in the responses provided by the user that the content provider has resolved the user's issue, such as the user responding "great, that's all, thank you," the gateway 110 can mark the conversation as resolved. The gateway 110 or the device 102, 104, or 106 on which the user is communicating with the content provider can also request input from the user or the content provider to clarify whether the issue has been resolved. For example, the screen-less assistant device 106 can provide voice output to the user separate from the conversation between the user and the content provider asking whether the issue has been resolved. If the user provides an affirmative response, the screen-less assistant device 106 can provide the response to the gateway 110 and the gateway 110 can mark the conversation as resolved and will not prompt or otherwise elicit further responses from the user.

In some examples, the gateway 110 can attempt to maintain the conversation with the content provider representative if the user will only temporarily be unavailable. For example, if the user receives a phone call on the mobile device 102, the gateway 110 can provide a response to the content provider on behalf of the user, such as "I will be right back, could you please hold?" The gateway 110 can then attempt to maintain the chat session until the user's next response.

Figure 3:
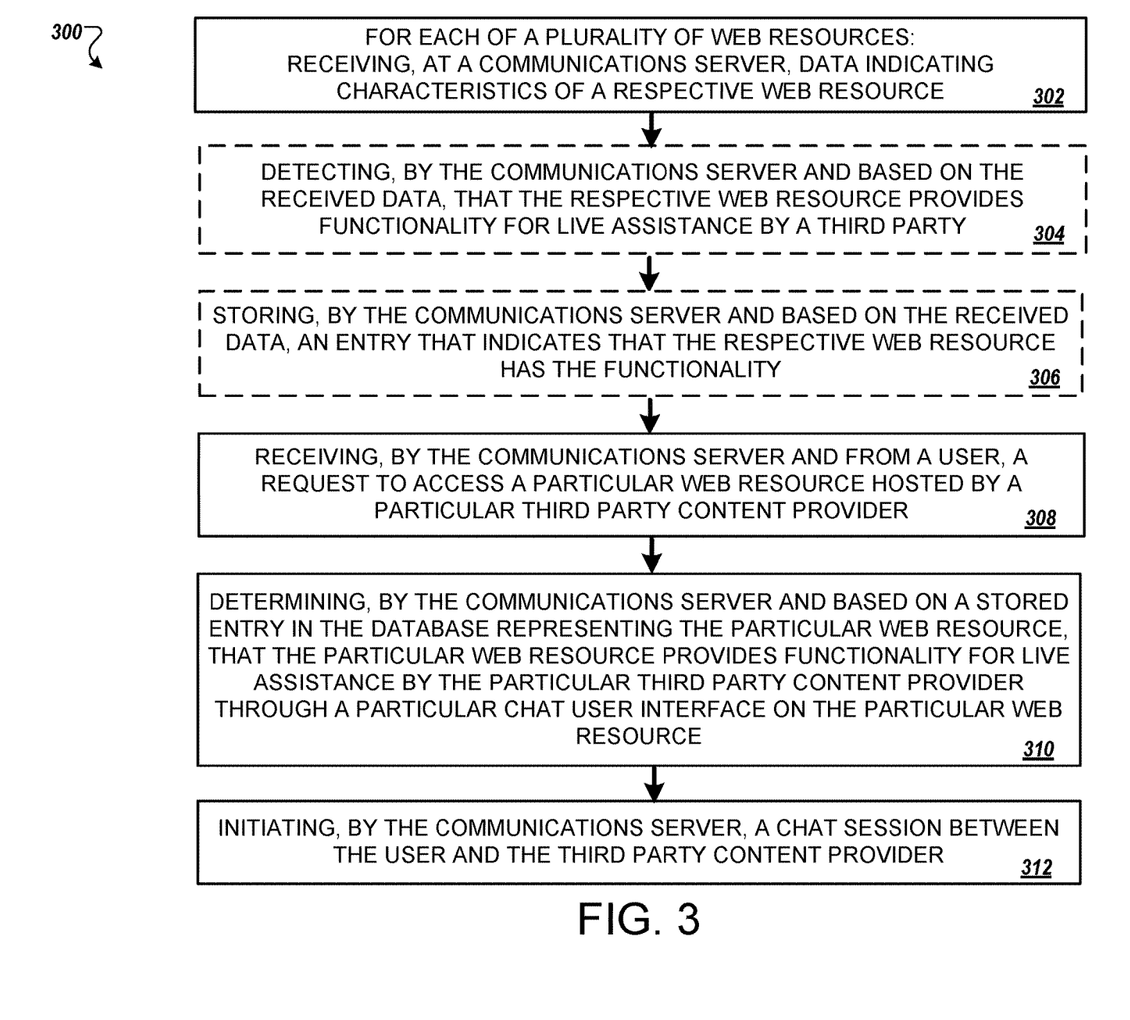
FIG. 3 is a flow chart of an example process for initiating and maintaining a chat session between a user and a third party content provider.

FIG. 3 is a flow chart of an example process 300 for initiating and maintaining a chat session between a user and a third party content provider. In some implementations, the process 300 can be implemented by a messaging system, such as the system 100. For example, the process 300 can be implemented by the gateway 110 of FIG. 1. In some implementations, the process 300 can be implemented as instructions stored on a non-transitory computer readable medium, and when the instructions are executed by one or more servers, the instructions can cause the one or more servers to perform operations of the process 300.

The process 300 begins when, for each of a plurality of web resources, a communications server receives data indicating characteristics of a respective web resource (302). For examples, the gateway 110 can receive data indicating characteristics of particular web pages, including whether the web pages include particular phrases, widgets, snippets of code, etc.

The process 300 continues when, for each of the plurality of web resources, the communications server detects, based on the received data, that the respective web resource provides functionality for live assistance by a third party content provider through a chat user interface on the respective web resource 304. In some examples, the chat user interface is a chat widget. The live assistance can be provided by a human representative of the particular third party content provider. The chat user interface can be presented on a web page that display results that are responsive to the search request and the content item. In some examples, the user accesses the chat session through a network-connected device. The network-connected device can be a mobile device, a desktop device, or any of various other network-connected devices. In some examples, the network-connected device does not have a screen.

In some examples, the detecting includes accessing the web resource, determining that a new window that is separate from a window in which the web resource is being accessed has opened, and determining, in the new window, a text phrase indicating that the web resource provides functionality for live assistance by third party content provider through a chat user interface on the web resource.

In some examples, the detecting includes accessing the web resource, identifying a widget on the web resource, and identifying, in code for the widget on the web resource, a tag indicating that the web resource provides functionality for live assistance by third party content provider through a chat user interface on the web resource.

The process 300 continues when, for each of the plurality of web resources, the communications server stores, in a database, an entry that indicates that the respective web resource has the functionality (306). For example, the gateway 110 can store, in a database, an entry that indicates that a particular web page has messaging functionality.

The process 300 continues when the communications server receives, from a user, a request to access a particular web resource hosted by a particular third party content provider (308). For example, the user can select a search result link that directs the user to a web resource associated with a particular content provider. In some examples, the request is provided in response to a selection of a content item that is presented in response to a search request, and links to the particular web resource. In some examples, the request to access the particular web resource comprises a voice input.

The process 300 continues when the communications server determines, based on a stored entry in the database representing the particular web resource, that the particular web resource provides functionality for live assistance by the particular third party content provider through a particular chat user interface on the particular web resource (310).

The process 300 continues when the communications server initiates a chat session between the user and the third party content provider (312). For example, the gateway 110 can initiate a chat session between the user and the content provider. In some examples, the chat session includes a first session between the communications server and the user, and a second session between the communications server and the third party content provider. In some examples, the initiating includes receiving, from the third party content provider, a first unique session identifier for the first session of the chat session, and providing, by the communications server and to the third party content provider, the first unique session identifier to facilitate the second session.

In some examples, the process 300 includes receiving input to the first session through the chat user interface, and providing, to the third party content provider, data indicating the user input to the second session. The process 300 can further include, for each of a plurality of chat sessions initiated for the particular web resource, determining, based on a unique identifier of the content item that directed the user to the particular web resource, a content item metric value for the chat session; generating, using the content item metric values, a presentation of the content item metric values; and providing, to the third party content provider, the presentation for display. For example, the content item metric value can include the click-through rate associated with the chat functionality.

In some examples, the process 300 includes detecting no activity for a predetermined period of time, and that at least one of the first session or the second session has ended. The process 300 includes determining, based on context data of the chat session, that the user has not completed the chat session, and storing, in the database, data indicating the entirety of the first session. The process 300 can continue by initiating, in response to detecting that the second session has ended, a third session between the communications server and the third party content provider as part of the chat session, and providing, by the communications system and to the third party content provider, the data indicating at least a portion of the first session such that the user is able to resume the chat session with the third party content provider.

In some examples, the process 300 further includes receiving a second voice input in the first session from the user. The process 300 continues with providing, to the third party content provider, data indicating a text representation of the second voice input in the second session. The process 300 continues with receiving, by the communications system and from the third party content provider, text input from the third party content provider in the second session between the communications system and the third party content provider. The process 300 can continue with providing, to the user, data indicating a voice representation of the text input from the third party content provider in the first session.

Figure 4:
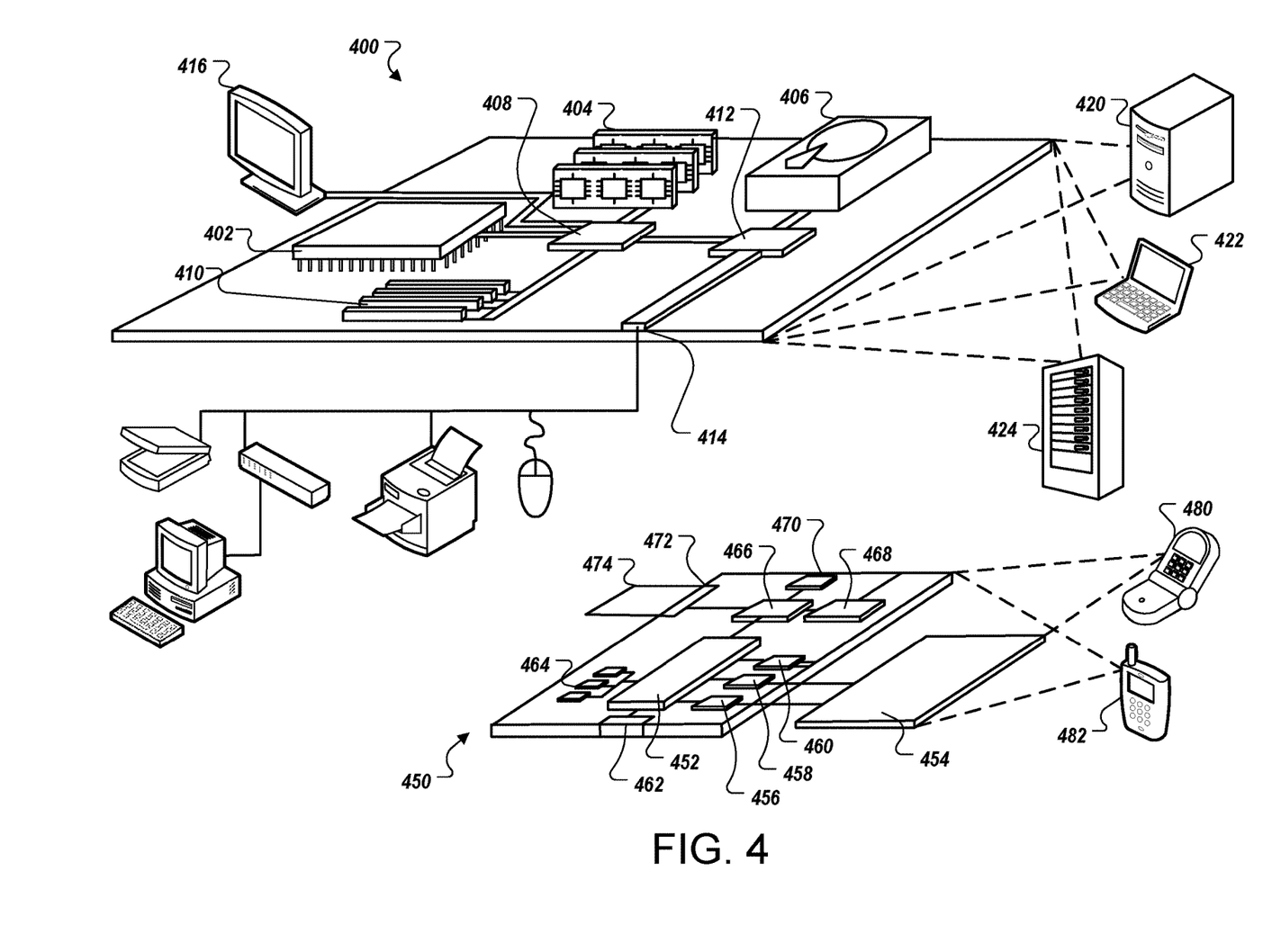
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   identifying, by a communications server, a web resource;
   determining, by the communications server and based on analysis of the identified web resource, that the web resource provides functionality for online chat assistance by a third party content provider through a chat user interface including:
      detecting that the web resource includes a code snippet that causes a new window, that displays the chat user interface and provides online chat functionality for communications between two or more parties, to be opened when a user selects a user interface element presented in the resource;
   receiving, by the communications server and from a user, a query to which the web resource hosted by the third party content provider is eligible for presentation as a result;
   modifying, by the communications server and in response to detecting that the web resource provides functionality for online chat assistance by the third party content provider through the chat user interface in the new window that provides the online chat functionality for communications between the user and the third party content provider, a content item result (i) that is provided in a search results page in response to the received query and (ii) that provides access to the web resource, including:
      incorporating, into the content item result, a control that initiates connection to the live system provided by the third party content provider without requiring the user to navigate away from the search results page to the web resource; and
   in response to a selection of the modified content item result from the search results page provided in response to the received query, initiating, by the communications server and without redirecting the user to the web resource, an online chat session between the user and the third party content provider, wherein the search results page is different than the web resource, and the search results page is provided by an entity other than the third party content provider.

2. The method of claim 1, wherein the chat session comprises i) a first session between the communications server and the user, and ii) a second session between the communications server and the third party content provider.

3. The method of claim 2, comprising:
receiving, at the communications server and from the user, input to the first session through the chat user interface;
providing, by the communication server and to the third party content provider, data indicating the user input to the second session; and
maintaining state information of the chat session between the user and the third party content provider.

4. The method of claim 2, comprising:
detecting, by the communications server, no activity for a predetermined period of time;
detecting, by the communications server, that at least one of the first session or the second session has ended;
determining, by the communications server and based on context data of the chat session, that the user has not completed the chat session;
storing, by the communications server and in a database, data indicating the entirety of the first session;
initiating, by the communications server and in response to detecting that the second session has ended, a third session between the communications server and the third party content provider as part of the chat session; and
providing, by the communications server and to the third party content provider, the data indicating at least a portion of the first session such that the user is able to resume the chat session with the third party content provider.

5. The method of claim 2, wherein the query the web resource comprises a voice input.

6. The method of claim 5, the method comprising:
receiving, by the communications server and from the user, a second voice input in the first session;
providing, to the third party content provider, data indicating a text representation of the second voice input in the second session;
receiving, by the communications server and from the third party content provider, text input from the third party content provider in the second session between the communications server and the third party content provider; and
providing, by the communications server and to the user, data indicating a voice representation of the text input from the third party content provider in the first session.

7. The method of claim 2, the initiating comprising:
receiving, by the communications server and from the third party content provider, a first unique session identifier for the first session of the chat session; and
providing, by the communications server and to the third party content provider, the first unique session identifier to facilitate the second session.

8. The method of claim 1, wherein the query is a search request submitted to a search engine.

9. The method of claim 1, wherein the chat user interface is presented on a web page that displays i) results that are responsive to the received query, and ii) the content item result.

10. The method of claim 1, wherein the chat user interface is a chat widget.

11. The method of claim 10, the detecting comprising:
accessing, by the communications server, the web resource;
identifying, by the communications server, a widget on the web resource; and
identifying, by the communications server and in code for the widget on the web resource, a tag indicating that the web resource provides functionality for live assistance by third party content provider through a chat user interface on the web resource.

12. The method of claim 1, wherein the online chat assistance is provided by a human representative of the particular third party content provider.

13. The method of claim 1, comprising:
for each of a plurality of chat sessions initiated for the web resource, determining, by the communications server and based on a unique identifier of the content item that directed the user to the particular web resource, a content item metric value for the chat session;
generating, by the communications server and using the content item metric values, a presentation of the content item metric values; and
providing, by the communications server to the third party content provider, the presentation for display.

14. The method of claim 1, the detecting comprising:
accessing, by the communications server, the web resource;
determining, by the communications server, that a new window that is separate from a window in which the web resource is being accessed has opened; and
determining, in the new window, a text phrase indicating that the web resource provides functionality for live assistance by third party content provider through a chat user interface on the web resource.

15. The method of claim 1, wherein the user accesses the chat session through a network-connected device.

16. The method of claim 15, wherein the network-connected device is a mobile device.

17. The method of claim 15, wherein the network-connected device is a desktop device.

18. The method of claim 15, wherein the network-connected device does not have a screen.

19. A system comprising:
a device communicably connected to a network;
a third party content provider server communicably connected to the network; and
a communications server that performs operations comprising:
identifying a web resource;
determining, by the communications server and based on analysis of the identified web resource, that the web resource provides functionality for online chat assistance by a third party content provider through a chat user interface including:
detecting that the web resource includes a code snippet that causes a new window, that displays the chat user interface and provides online chat functionality for communications between two or more parties, to be opened when a user selects a user interface element presented in the resource;
receiving, by the communications server and from a user, a query to which the web resource hosted by the third party content provider is eligible for presentation as a result;
modifying, by the communications server and in response to detecting that the web resource provides functionality for online chat assistance by the third party content provider through the chat user interface in the new window that provides the online chat functionality for communications between the user and the third party content provider, a content item result (i) that is provided in a search results page in response to the received query and (ii) that provides access to the web resource, including:
   incorporating, into the content item result, a control that initiates connection to the live system provided by the third party content provider without requiring the user to navigate away from the search results page to the web resource; and
in response to a selection of the modified content item result from the search results page provided in response to the received query, initiating, by the communications server and without redirecting the user to the web resource, an online chat session between the user and the third party content provider, wherein the search results page is different than the web resource, and the search results page is provided by an entity other than the third party content provider.

20. At least one computer-readable storage medium encoded with executable instructions that, when executed by at least one processor, cause the at least one processor to perform operations comprising:
   identifying, by a communications server, a web resource;
   determining, by the communications server and based on analysis of the identified web resource, that the web resource provides functionality for online chat assistance by a third party content provider through a chat user interface including:
      detecting that the web resource includes a code snippet that causes a new window, that displays the chat user interface and provides online chat functionality for communications between two or more parties, to be opened when a user selects a user interface element presented in the resource;
   receiving, by the communications server and from a user, a query to which the web resource hosted by the third party content provider is eligible for presentation as a result;
   modifying, by the communications server and in response to detecting that the web resource provides functionality for online chat assistance by the third party content provider through the chat user interface in the new window that provides the online chat functionality for communications between the user and the third party content provider, a content item result (i) that is provided in a search results page in response to the received query and (ii) that provides access to the web resource, including:
      incorporating, into the content item result, a control that initiates connection to the live system provided by the third party content provider without requiring the user to navigate away from the search results page to the web resource; and
   in response to a selection of the modified content item result from the search results page provided in response to the received query, initiating, by the communications server and without redirecting the user to the web resource, an online chat session between the user and the third party content provider, wherein the search results page is different than the web resource, and the search results page is provided by an entity other than the third party content provider.

\* \* \* \* \*